(12) United States Patent
Lewis et al.

(10) Patent No.: US 8,353,276 B2
(45) Date of Patent: Jan. 15, 2013

(54) SYSTEM AND METHOD FOR STORING CRANKCASE GASES TO IMPROVE ENGINE AIR-FUEL CONTROL

(75) Inventors: Donald J. Lewis, Howell, MI (US); Jeffrey Scott Hepburn, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1215 days.

(21) Appl. No.: 12/176,198

(22) Filed: Jul. 18, 2008

(65) Prior Publication Data

US 2010/0012103 A1  Jan. 21, 2010

(51) Int. Cl.
*F16K 17/04* (2006.01)
(52) U.S. Cl. ........................................................ 123/572
(58) Field of Classification Search .......... 123/572–574, 123/41.86
See application file for complete search history.

(56) References Cited

U.S. PATENT DOCUMENTS

| | | | |
|---|---|---|---|
| 4,530,210 A | 7/1985 | Yamazaki | |
| 5,005,550 A | 4/1991 | Bugin, Jr. et al. | |
| 5,201,301 A * | 4/1993 | Re | 123/573 |
| 5,331,940 A | 7/1994 | Takayama | |
| 5,499,616 A * | 3/1996 | Enright | 123/572 |
| 5,586,996 A * | 12/1996 | Manookian, Jr. | 55/321 |
| 5,992,397 A | 11/1999 | Hideaki et al. | |
| 6,000,367 A | 12/1999 | Huff et al. | |
| 6,138,644 A | 10/2000 | Saruwatari et al. | |
| 6,422,224 B1 * | 7/2002 | Walker, Jr. | 123/572 |
| 6,446,618 B1 | 9/2002 | Hill | |
| 6,606,982 B1 | 8/2003 | Stockhausen et al. | |
| 6,640,793 B1 * | 11/2003 | Kabat et al. | 123/574 |
| 6,659,093 B2 | 12/2003 | Kim | |
| 6,679,228 B1 | 1/2004 | Confer et al. | |
| 6,729,316 B1 | 5/2004 | Knowles | |
| 6,739,320 B2 | 5/2004 | Ito et al. | |
| 6,807,958 B2 * | 10/2004 | Kabat et al. | 123/574 |
| 6,966,304 B2 | 11/2005 | Nagaishi et al. | |
| 6,970,957 B1 | 11/2005 | Oshins et al. | |
| 6,997,172 B2 | 2/2006 | Oshimi et al. | |
| 7,293,552 B2 | 11/2007 | Leone et al. | |
| 7,316,223 B2 | 1/2008 | Wakahara | |
| 7,891,346 B2 * | 2/2011 | Asanuma et al. | 123/572 |
| 2001/0022175 A1 * | 9/2001 | Moren | 123/572 |
| 2004/0069286 A1 * | 4/2004 | Knowles | 123/572 |
| 2004/0244368 A1 | 12/2004 | Yang et al. | |
| 2005/0061305 A1 * | 3/2005 | Pietschner | 123/572 |
| 2007/0074708 A1 * | 4/2007 | Amano et al. | 123/572 |
| 2007/0113831 A1 | 5/2007 | Hoke et al. | |
| 2007/0227515 A1 | 10/2007 | Uchida | |
| 2010/0012099 A1 | 1/2010 | Kerns et al. | |

* cited by examiner

*Primary Examiner* — M. McMahon
(74) *Attorney, Agent, or Firm* — Julia Voutyras; Alleman Hall McCoy Russell & Tuttle LLP

(57) ABSTRACT

A system and method for improving processing of gases contained within the crankcase of an internal combustion engine is presented. The system is especially suited for single boiling point fuels because it allows the storage of such fuels until the fuel can be opportunistically combusted.

11 Claims, 3 Drawing Sheets

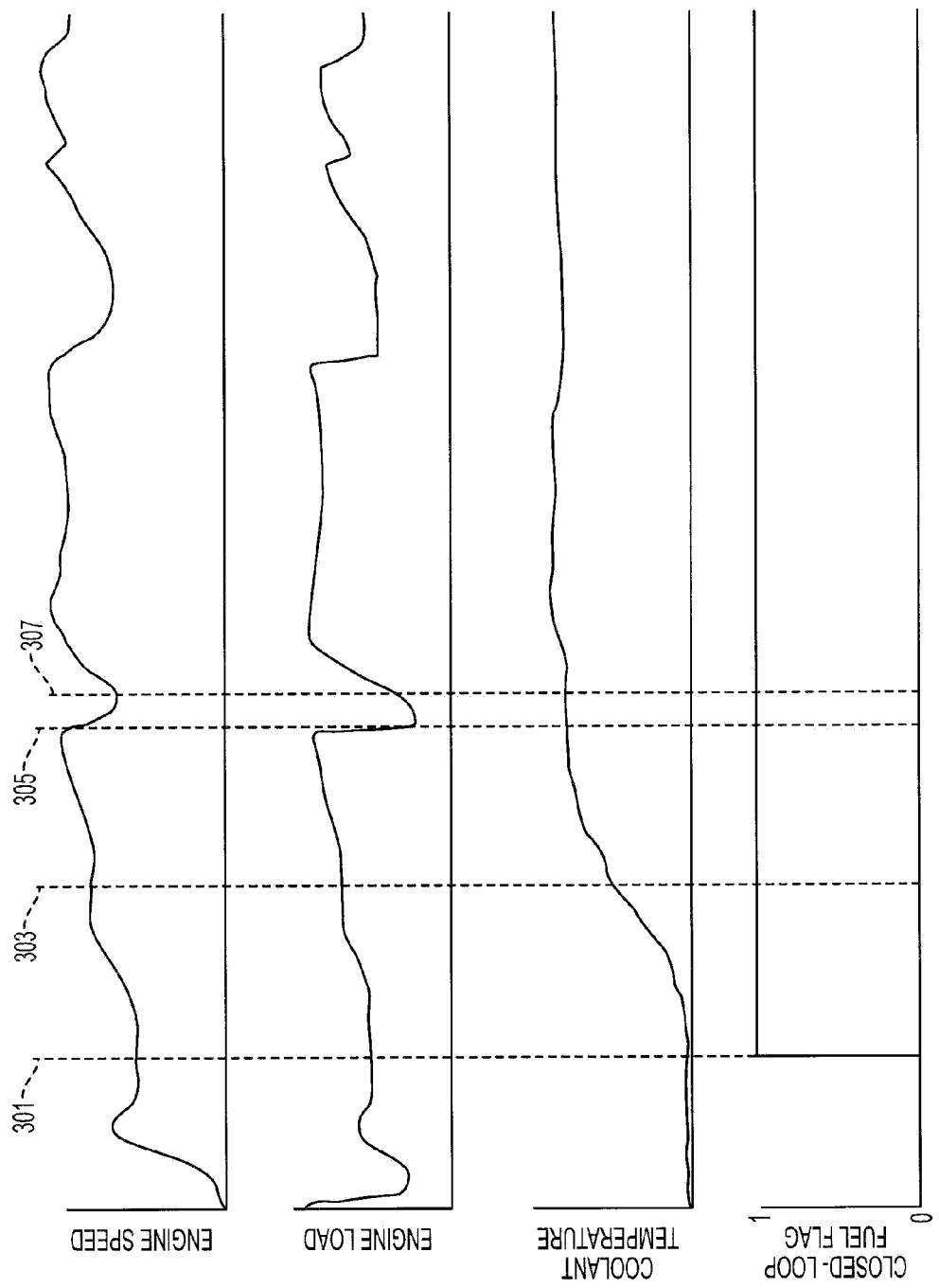

SYSTEM AND METHOD FOR STORING CRANKCASE GASES TO IMPROVE ENGINE AIR-FUEL CONTROL

FIELD

The present description relates to a system and method for combusting internal combustion engine crankcase gases.

BACKGROUND

A system and method for operating an internal combustion engine using positive crankcase ventilation (PCV) is described in U.S. Pat. No. 6,729,316. The patent describes a system wherein emissions are pumped from a crankcase to a canister. The canister contains a deceleration and condensing element comprised of glass beads. It is believed that the glass beads decelerate flow originating from the crankcase and cause hydrocarbons to condense so that they can be discharged to a collector. The canister purportedly separates contaminants from the crankcase and then passes the cleansed emissions back to the engine for combustion.

The above-mentioned system can also have several disadvantages. Specifically, fuel vapors are sent to the engine shortly after being processed through the canister. If the crankcase gases are related to a single boiling point fuel (e.g., alcohol), much of the alcohol can transition to the vapor state in a short period of time. As such, concentrated vapors can be drawn into the separating canister and then transferred to the engine at a rate that causes the engine to run rich. Thus, the canister may extract contaminants from the crankcase emissions, but the device does not appear to offer any means to control the rate that exhaust gases are transferred to the engine. Further, if crankcase gases cause the engine to operate rich, the engine controller adaptive fuel strategy may cause the engine to operate lean after the crankcase gases are purged from the engine. Thus, it does not appear that the system improves engine air-fuel control when gasses are purged from the engine crankcase.

The inventors herein have recognized the above-mentioned disadvantages and have developed a system and method that offers substantial improvements.

SUMMARY

One embodiment of the present description includes a system for combusting internal combustion engine crankcase gases, the system comprising: an internal combustion engine comprising a crankcase, an intake manifold, a duct connecting the crankcase to the intake manifold, a canister comprising hydrocarbon storage media, the canister located along the length of the duct and in communication with the duct, and an adjustable valve capable of regulating flow of gases from the crankcase to the canister. This system overcomes at least some disadvantages of the above-mentioned system.

Venting gases from an engine's crankcase to the engine's intake system may be improved by trapping the gases before they are directed to the engine's intake system. A hydrocarbon trap can be installed in the path between the crankcase and intake manifold to trap hydrocarbons as they move from the crankcase toward the engine's intake system. The trap can be used to control the rate at which hydrocarbons are introduced to the intake manifold. Specifically, an engine controller can use valves and purge air temperature control to adjust the rate that hydrocarbons enter the intake system. Further, the controller can make adjustments to engine fuel injection timing to compensate the controlled release of hydrocarbons to the engine intake system. This system is particularly beneficial when single boiling point fuels are vented from the engine crankcase because the hydrocarbons can be stored during a short time period and released over a longer time period.

The present description can provide several advantages. For example, the present system can reduce air-fuel excursions when crankcase gases are vented because the system can control hydrocarbon flow from the canister and because it takes less time to compensate for small air-fuel variations than for large air-fuel variations. Further, the system can store high concentration hydrocarbons over a short period of time. Therefore, the system is suitable for processing single boiling point fuels. Further still, the system can be controlled such that crankcase gases are stored during some engine operating conditions and released during other operating conditions. Consequently, crankcase gases can be combusted more efficiently.

The above advantages and other advantages, and features of the present description will be readily apparent from the following Detailed Description when taken alone or in connection with the accompanying drawings.

BRIEF DESCRIPTION OF THE DRAWINGS

The advantages described herein will be more fully understood by reading an example of an embodiment, referred to herein as the Detailed Description, when taken alone or with reference to the drawings, wherein:

FIG. 3 is an example crankcase ventilation sequence.

DETAILED DESCRIPTION

Figure 1:
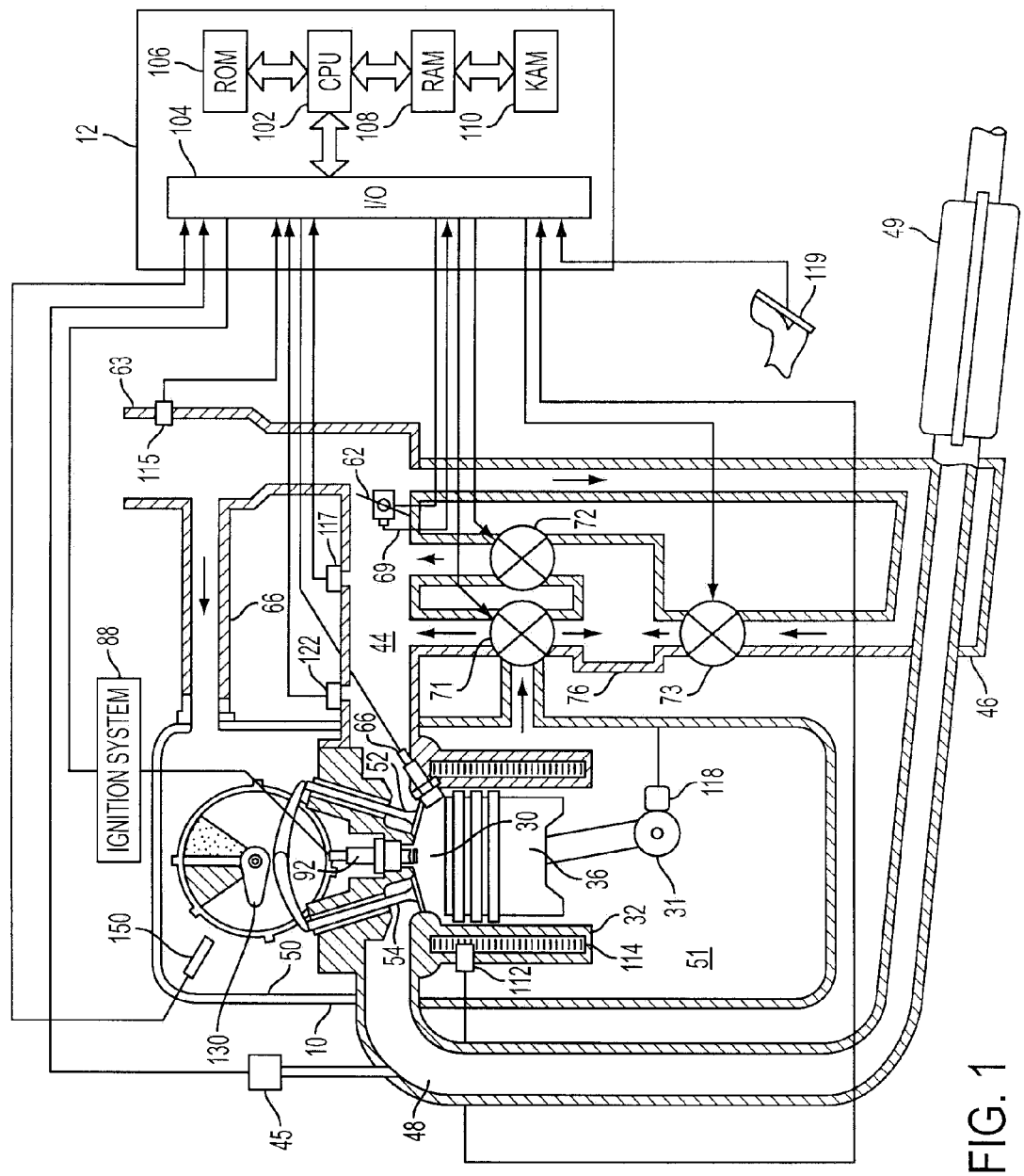
FIG. 1 is a schematic diagram of an example engine having crankcase ventilation and its control system.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 31. Combustion chamber 30 is known communicating with intake manifold 44 and exhaust manifold 48 via respective intake valve 52 an exhaust valve 54.

Each intake and exhaust valve is operated by a mechanical camshaft 130 that is rotated by coupling the camshaft to crankshaft 31. In an alternative embodiment, one or more valves may be operated by electrical or hydraulic actuators.

Fresh air enters intake plenum 63 where its mass is determined by mass air sensor 115. Most fresh air is routed into engine 10 through electrically controlled throttle 62 where it enters intake manifold 44. However, a portion of inducted air enters engine 10 through valve cover 50 by way of duct 66. Air is drawn through duct 66 by a differential pressure between intake manifold 44 and crankcase 51. Air goes from the cylinder head to crankcase 51 by way of passages that connect the cylinder head and the crankcase. As the air passes through the cylinder head and crankcase, it mixes with and displaces fuel vapors inside the engine. Fuel vapors exit crankcase 51 and are routed through valve 71 to intake manifold 44 or through PCV canister 76. PCV Canister 76 may contain carbon, zeolite, or an alternate form of hydrocarbon storage media. Fuel vapors can be purged from PVC canister 76 by opening valve 72 and providing fresh air across the trapping media by way of optional valve 73. The fresh air may be heated by exhaust gas heat exchanger 46 or by another means to increase the rate at which hydrocarbons are released from the trapping media. In an alternative embodiment, heated crankcase gases may be used to purge a canister of hydrocarbons by allowing crankcase gases to pass through valve 71 and valve 72 to intake manifold 44.

In an alternative embodiment, PCV canister 76 may be sealed within the engine (e.g., under the valve cover or in the crankcase) so that the hydrocarbon storage media remains at an elevated temperature after the engine warms. Keeping the media temperature elevated may increase the rate at which hydrocarbons can be purged from the storage media.

Intake manifold 44 provides a conduit for air to travel between throttle 62 and intake valve 52. Fuel is directly injected to combustion chamber 30 by way of injector 66. Fuel is delivered to fuel injector 66 by fuel system (not shown) including a fuel tank, fuel pump, and fuel rail (not shown). Alternatively, the engine may be configured such that the fuel is injected into a port of intake manifold 44, if desired.

Distributorless ignition system 88 provides ignition spark to combustion chamber 30 via spark plug 92 in response to controller 12. Universal Exhaust Gas Oxygen (UEGO) sensor 45 is shown coupled to exhaust manifold 48 upstream of catalytic converter 49. Alternatively, a two-state exhaust gas oxygen sensor may be substituted for UEGO sensor 45.

Converter 49 can include multiple catalyst bricks in one example. In another example, multiple emission control devices, each with multiple bricks, can be used. Converter 49 can be a three-way type catalyst in one example.

Controller 12 is shown in FIG. 1 as a conventional microcomputer including: microprocessor unit 102, input/output ports 104, and read-only-memory 106, random-access-memory 108, 110 Keep-alive-memory, and a conventional data bus. Controller 12 is shown receiving various signals from sensors coupled to engine 10, in addition to those signals previously discussed, including: engine coolant temperature (ECT) from temperature sensor 112 coupled to water jacket 114; a throttle position sensor 69; a cam position sensor 150; a position sensor 119 coupled to a accelerator pedal; a measurement of engine manifold pressure (MAP) from pressure sensor 122 coupled to intake manifold 44; a measurement (ACT) of engine air amount temperature or manifold temperature from temperature sensor 117; and a engine position sensor from sensor 118 sensing crankshaft 40 position. Sensor 118 may be a variable reluctance, Hall effect, optical, or magneto-resistive sensor. Alternatively, a camshaft position sensor may also be provided and may be used to determine engine position. In a preferred aspect of the present description, engine position sensor 118 produces a predetermined number of equally spaced pulses every revolution of the crankshaft from which engine speed (RPM) can be determined.

Storage medium read-only memory 106 can be programmed with computer readable data representing instructions executable by processor 102 for performing the methods described below as well as other variants that are anticipated but not specifically listed.

In an alternative embodiment (not shown), engine 10 is a diesel engine wherein fuel is injected directly into a cylinder and combusted via compression ignition. PCV canister 76 is positioned between crankcase 51 and intake manifold 44. If desired, compressed air from a compressor can be routed to PCV canister 76 such that throttle 62 is bypassed. The compressed air flows over the canister storage medium and strips hydrocarbons from the storage medium. The hydrocarbons are then directed into the intake manifold by way of a control valve 72. This arrangement allows the canister to be purged even when the intake manifold is near or higher than atmospheric pressure.

In yet another embodiment (also not shown), compressed air can be directed through PCV canister 76 without bypassing throttle 62 by providing valves that direct flow through the PCV canister and then through throttle 62.

In still another embodiment, the PCV canister contents can be routed to the inlet side of an inlet compressor so that the low pressure side of the compressor draws PCV canister vapors into the engine.

Figure 2:
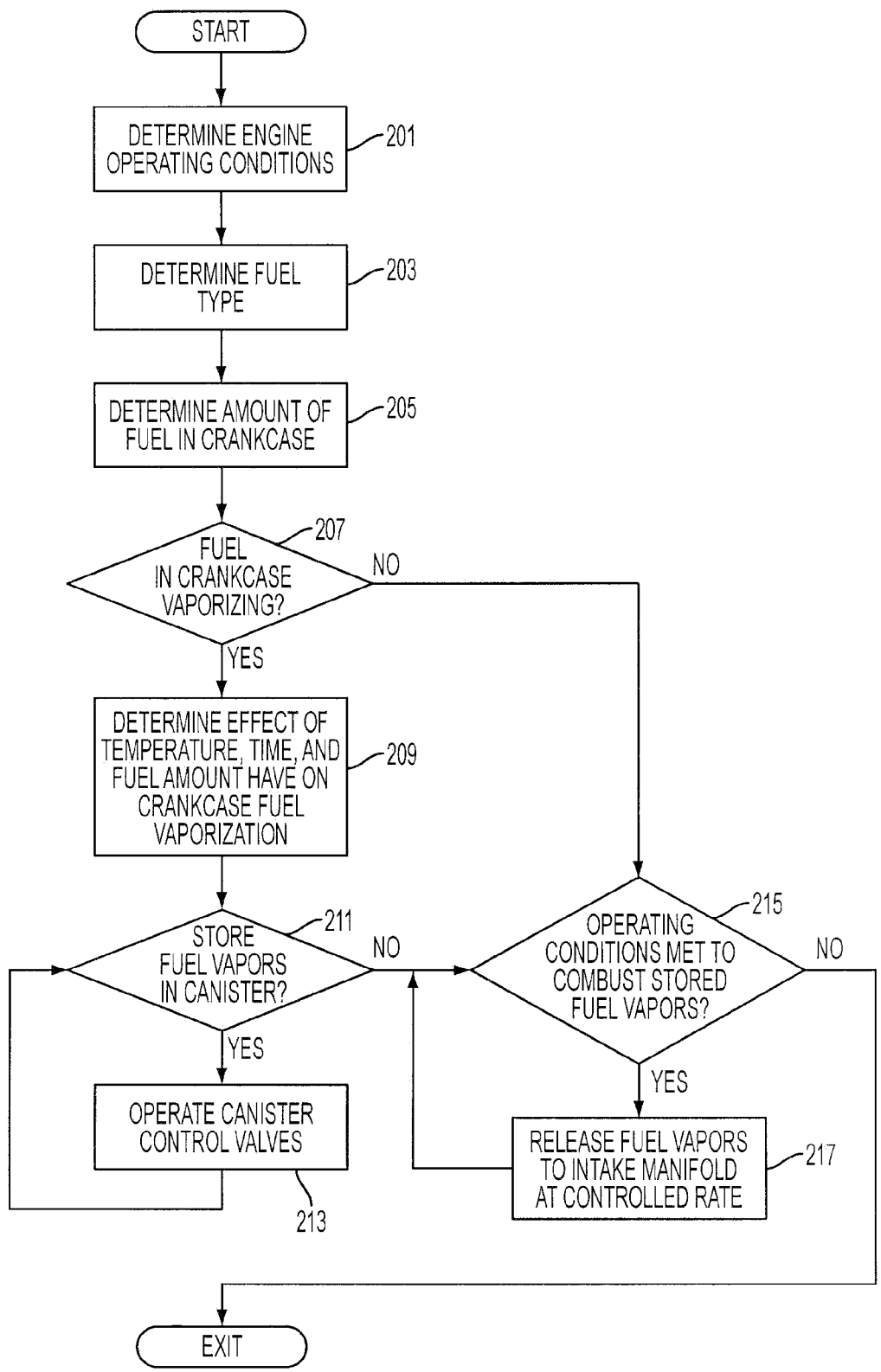
FIG. 2 is a flowchart of an example method for improving compensation for crankcase ventilation.

Referring now to FIG. 2, an example flowchart for improving crankcase ventilation compensation is shown. At step 201, engine operating conditions are determined. Engine coolant temperature, time since start, ambient temperature, engine load, fuel injection amount, and exhaust gas oxygen concentration are inferred or sensed. However, additional or fewer engine operating parameters may be input from sensor data. In addition, some engine operating conditions determined from characterized data and from other sensed engine operating conditions. For example, engine exhaust gas temperature may be inferred from engine speed, cylinder air charge, and engine coolant temperature. After determining engine operating conditions, the routine proceeds to step 203.

At step 203, the routine determines the type of fuel (e.g., gasoline, ethanol, mixtures of gasoline and ethanol, diesel, or natural gas) being injected to the engine. In one embodiment, fuel type for the present engine start can be determined from information stored in the engine controller during the last period of time that the engine operated. In other words, it can be assumed that the fuel combusted just prior to an engine stop is the substantially the same fuel used to start the engine. For example, fuel type can be inferred from the amount of fuel injected, the cylinder air amount, and the exhaust gas oxygen concentration. Specifically, fuel type can be inferred from the ratio of fuel to air that produces a stoichiometric exhaust gas mixture. The stoichiometric air-fuel ratio can then be related to a specific fuel type. For example, when stoichiometric exhaust is detected at an air-fuel ratio of about 9:1 the engine controller can infer that the type of fuel being combusted as ethanol.

Alternatively, a sensor in the fuel supply line may be used to determine the type of fuel that will be combusted in the engine. Such a sensor may assess fuel type by refraction, sensed capacitance, or other known methods. Similar to the method described above, sensor information that indicates fuel type at engine stop can be used to determine and indicate fuel type at start. After the fuel type is determined the routine proceeds to step 205.

At step 205, the routine determines or estimates the amount of fuel in the engine crankcase that can vaporize. In one embodiment, the routine uses engine temperature, the number of cylinder combustion events, type of fuel, amount of fuel injected, crank angle at which fuel is injected, and the estimated amount of fuel in the crankcase at the last engine stop to estimate the amount of fuel presently in the crankcase. The routine also has the capacity to determine the entire mass of fuel in the crankcase as well as the individual fuel masses that make up the total estimated crankcase fuel mass.

In one embodiment, the routine estimates that a fraction of the total amount of fuel injected to a cylinder during a combustion cycle that ends up in the crankcase. Engine temperature, type of fuel injected, and crankshaft angle at which injection occurs are used to look-up empirically determined factors that when added together represent the fractional amount of a cylinder's fuel charge that ends up in the crankcase. This fractional amount is multiplied by the amount of fuel injected into a cylinder to determine an amount of fuel that entered the crankcase during a particular combustion event. The fuel type (i.e., the fractional concentrations of gasoline and alcohol) determined in step 203 are multiplied by the total estimated mass of fuel entering the crankcase. In this way, the masses of the individual fuel components entering the crankcase can be determined. The total amount of a particular fuel in the engine crankcase can be determined by subtracting the amount of that type of fuel purged from the crankcase from the amount of that type of fuel that has entered the crankcase. The total fuel amount of a particular type of fuel in the crankcase can be expressed as:

$$Fuel\_liq_1 = Int\_crk\_fuel_1 + \Sigma(Crk\_cyl_1(n) - Crk\_prg_1(n))$$

where Fuel_liq represents the total amount of liquid fuel in the crankcase, Int_crk_fuel represents the estimated amount of fuel in the crankcase before the engine is started, Crk_cyl (n) is the amount of fuel entering the crankcase each cylinder cycle, Crk_prg(n) is the amount of fuel evacuated from the crankcase each cylinder cycle and is related to or a function of the amount of fuel in vapor state Fuel_vap determined in step 209, n is the number of cylinder cycles from engine start, and the subscript denotes a particular fuel type (e.g., 1=gasoline; 2=ethanol; 3=methanol).

If the engine is stopped before the time to fully vaporize the crankcase fuel has transpired, then the remaining individual fuel amounts can be stored in memory and used when the engine is restarted. The fuel amounts stored in memory are combined with or added to the fuel amounts estimated to entering the crankcase during the present start, thereby increasing the estimated fuel amount in the crankcase and the purge time. In this way, fuel that enters the crankcase over many engine starts can be accounted for if the crankcase temperatures do not reach the fuel vaporization temperature.

It should also be noted that for equal volumes of gasoline and ethanol, substantially all ethanol will go from a liquid state to a gaseous state when the boiling point of ethanol is reached and when given enough time. On the other hand, the total amount of gasoline going into vapor will gradually increase as the temperature of gasoline is increased. As such, for equal volumes of gasoline and ethanol, more ethanol vapor may be purged from a crankcase over a shorter time interval as long as the boiling temperature of ethanol is reached.

After determining the amount of fuel in the crankcase, the routine proceeds to step 207.

At step 207, the routine determines if fuel vaporization has commenced. In one embodiment, the onset of fuel vaporization (i.e., the PCV lower vaporization temperature limit or the lower temperature limit at which the fuel begins to vaporize at ambient pressure) in the crankcase is related to engine coolant temperature or engine oil temperature. In one example, if the engine coolant temperature or engine oil temperature exceeds a first predetermined value, then a particular fuel type may be considered to be transitioning to a vapor state. On the other hand, if coolant temperature is less than the predetermined amount, no or insignificant fuel vaporization is deemed to have occurred for the particular fuel type. In some embodiments, if coolant temperature exceeds a second predetermined temperature (i.e., the PCV upper vaporization temperature limit or the temperature limit at which the fuel is substantially vaporized) for a predetermined amount of time that is related to the amount of fuel in the crankcase, the strategy may determine that all the condensed fuel in the crankcase has been vaporized. However, fuel in a gaseous state may continue to enter the crankcase if it passes the piston rings.

It should also be noted that the above-mentioned lower and upper vapor limit temperatures can be varied to accommodate different types of fuel. Thus, one type of fuel may be determined to begin to vaporize at an engine coolant temperature of 75° C. and be completely vaporized at 80° C. while a different type of fuel may begin to vaporize at 10° C. and be completely vaporized at 95° C. at the same pressure.

It should also be noted that there are other methods for determining or estimating the amount of fuel in the engine crankcase. Therefore, the above method is not intended to limit the breadth of the present description, but rather as a non-limiting example.

If fuel vaporization has commenced the routine proceeds to step 209. If not, the routine proceeds to step 215.

In step 209, the routine determines the effect that engine temperature, time at a temperature, fuel type, and amount of fuel in the crankcase have on fuel vaporization within the crankcase. In one example, these factors may be empirically determined or determined by modeling and then multiplied together to form a first-order time constant that represents fuel the vaporization rate within the crankcase. The fuel in vapor state can then be expressed as:

$$Fuel\_vap = Fuel\_liq \cdot e^{-\alpha t}$$

Where Fuel_vapor is the estimated fuel mass that is in vapor state; Fuel_liq is the liquid fuel mass in the crankcase determined in step 205; e is base of the natural logarithm; $\alpha$ is the variable determined from engine temperature, effect of time at a temperature, and fuel type; and t is time since fuel is at conditions for vaporization. Of course, higher order estimates that represent vaporization rates for different types of fuels may also be constructed if desired. After determining the amount of fuel in vapor the routine proceeds to step 211.

At step 211, the routine determines if it is desirable to store fuel vapors in a PCV canister.

Based on the fuel type determined in step 203, the routine can select alternative strategies or methods to decide when to store crankcase hydrocarbons in the PCV canister.

In one embodiment, when gasoline is in the crankcase and the engine is cold started, fuel vapors are directed from the engine crankcase to the storage media by positioning valve 71 such that PCV canister 76 is in communication with crankcase 51 (hydrocarbon storage mode). Simultaneously, valve 72 is opened to allow a path for hydrocarbon reduced gas to pass from crankcase 51 to intake manifold 44. The crankcase gases are passed through PCV canister 76 until the engine air-fuel control is adjusted from sensed exhaust gases, or until a predetermined time or operating condition occurs (e.g., engine coolant temperature or engine oil temperature reaching predetermined conditions). After hydrocarbon storage is complete, the state of valve 71 is changed so that crankcase gases can flow directly to the intake manifold and valve 72 is closed (PCV canister bypass mode).

In another embodiment, when alcohol is in the crankcase, and the engine is cold started, valve 71 is positioned to allow communication between crankcase 51 and intake manifold 44. When a temperature of the engine (e.g., coolant temperature or oil temperature) reaches a predetermined value, valve 71 is positioned to allow communication between crankcase 51 and PCV canister 76. At this time, valve 72 is also opened to allow hydrocarbon reduced gases to flow from crankcase 51 to intake manifold 44. Valve 72 is closed and valve 71 is returned to the position that allows crankcase gases to bypass PCV canister 76 when engine temperature reaches a second temperature or after a predetermined amount of time. Alternatively, valves 71 and 72 can be repositioned from the hydrocarbon storage mode to the bypass mode when a temperature of the engine reaches a predetermined temperature for a predetermined amount of time. The predetermined amount of time can be related to the type and estimated amount of fuel in the crankcase.

In still another envisioned embodiment, the routine uses a plurality of parameters including, but not limited to coolant temperature, time since start, amount of fuel in the crankcase, and the amount of stored fuel vapor to determine when to store crankcase vapors to the PCV canister.

If conditions are met to store vapors to a PCV canister the routine proceeds to step 213. If not, the routine proceeds to step 215.

In step 213, the routine commands selected control valves in a manner that will cause crankcase fuel vapors to be stored in a canister.

In one embodiment, valves are commanded as described in step 211. This is accomplished by way of two-way valve 71 and one-way valve 72.

In another embodiment, two-way valve 71 is replaced by two one-way valves and the valves are commanded to store crankcase hydrocarbons in canister 76. After the canister control valves are operated the routine returns to step 211.

At step 215, the routine determines whether engine operating conditions are desirable for combusting stored fuel vapors. In one embodiment, canister purge is permitted after a plurality of engine operating conditions have been met, the conditions including but not limited to the engine exceeding a predetermined coolant temperature, a predetermined period of time since engine start has been exceeded, and the engine being within a prescribed speed and load region. In other embodiments, fewer engine conditions may be required to purge the canister. For example, the canister may be purged when the engine is operated at higher loads so that the fraction of combusted hydrocarbons originating from the canister is low as compared to the amount of fuel being injected. In another embodiment, canister purge is permitted after the engine coolant temperature reaches a predetermined temperature.

Once started, the canister purging process can continue until the exhaust gas oxygen sensor detects little or no hydrocarbons related to the crankcase or until other engine operating conditions indicated that canister purging should be inhibited. For example, crankcase purging can be stopped if sensors detect no change in exhaust gas hydrocarbons when the flow of crankcase gases is cycled on and off. In another example, crankcase purging can be deactivated when the engine shuts off fuel during deceleration or when engine load is less than a predetermined amount.

If the engine operating conditions have been met for combusting stored hydrocarbons the routine proceeds to step 217. Otherwise, the canister flow control valves are closed and the routine proceeds to exit.

At step 217, the routine releases fuel trapped in a canister into the engine intake manifold. In the embodiment shown in FIG. 1, the canister is purged when two-way valve 71 is positioned such that crankcase vapors flow from the crankcase to the intake manifold. At the same time, valve 72 is opened to allow fuel vapors from the canister to enter the intake manifold. In addition, valve 73 is opened to allow heated fresh air to flow through canister 76. The heated air strips fuel from the canister media and the enriched air enters the intake manifold via valve 72. The air may be heated from engine heat or by other known methods. Valve 72 may also be modulated so as to control the release of canister vapor into intake manifold 44. In one embodiment, a pulsewidth modulated control signal is sent to valve 72 to control the average position of valve 72. Since the air enters canister 76 from upstream of throttle 62, and since pressure in intake manifold 44 may be lower than pressure upstream of throttle 62, a pressure differential causes enriched air to flow from upstream throttle 62 to intake manifold 44.

In an alternative embodiment, the canister may be purged using heated crankcase gases. That is, valve 71 is positioned such that crankcase gases flow into the canister and valve 72 is opened so that gases move through the canister and are discharged to intake manifold 44. Using crankcase gases to purge the canister may be a more cost effective way to purge the canister because valve 73 and heat exchanger 46 may be eliminated from the system for some engine configurations.

In another alternative embodiment, a compressor may be located upstream of throttle 62. In this embodiment, positive pressure created by the compressor can be used to pressurize canister 76 and cause fuel vapors to enter intake manifold 44. Thus, fuel vapors can be pushed or pulled through canister 76 into intake manifold 44 to facilitate purging of stored hydrocarbons from canister 76.

As mentioned above, valve 72 can be modulated to control the flow of enriched air from canister 76 to intake manifold 44. In one embodiment, the duty cycle of valve 72 is controlled in response to engine speed, engine load, the amount of fuel stored in the vapor canister, and sensed oxygen in exhaust gases. A three dimensional table is indexed by engine speed, engine load, and estimated stored hydrocarbons. The duty cycle of the canister flow control valve (e.g., valve 72 in FIG. 1) is increased (average valve opening is increased) as engine speed and engine load increase. Valve opening amount is decreased when the amount of hydrocarbons stored in the canister is high and engine speed and load are low. Further, the valve opening amount is increased when the amount of hydrocarbons stored in the canister is low and engine speed and load are low. Oxygen sensor feedback may also be used to adjust the canister flow control valve duty cycle. If oxygen is detected in the exhaust gas at a higher concentration than is expected, the canister purge valve average opening amount can be increased while the throttle opening is reduced. The throttle opening amount is reduced in proportion to the increase in the canister flow control valve opening amount. Likewise, if oxygen detected in the exhaust gas is at a lower concentration than is expected, the average canister purge valve opening amount can be reduced while the throttle position is substantially maintained.

In another embodiment, fuel injection timing can be adjusted when the PCV canister is purged so that the engine delivers the desired amount of fuel. In particular, the amount of injected fuel is decreased by the amount of fuel estimated to enter the engine by way of the PCV canister. Further, the fuel injection amount can be increased or decreased as the oxygen concentration in the exhaust varies. Thus, the system can compensate for the release of PCV hydrocarbons by adjusting fuel injection timing.

After the canister flow control valves are positioned routine returns to step 215.

Referring now to FIG. 3, an example PCV purge cycle is shown. Plots of engine speed, engine load, engine coolant temperature, and closed-loop fuel flag are used to illustrate an example PCV canister purge sequence. The sequence begins on the left and proceeds to the right. The plots of FIG. 3 are used to illustrate several different PCV canister purging cycles that are related to different fuel types.

When fuels comprised of more than a predetermined amount of gasoline are in the crankcase (e.g., 80%), the PCV canister is filled and purged such that hydrocarbons liberated from the crankcase over a wide temperature range are advantageously combusted by the engine. In one embodiment, PCV canister valves are operated so that crankcase hydrocarbons are stored in the PCV canister from engine crank until vertical marker 301 is reached. In one example, where PCV canister control valves are configured as illustrated in FIG. 1, valve 71 opens to allow gases to flow from crankcase 51 to canister 76. And valve 72 is opened to allow gas to exit PCV canister 76. Vertical marker 301 indicates the time at which the engine goes into closed-loop fuel control. In another embodiment, the PCV canister valves are operated so that crankcase hydrocarbons are stored in the PCV canister from engine crank until a predetermined temperature of the engine is reached at vertical marker 303.

Hydrocarbons may be released from the PCV canister at different times depending on engine operating conditions and control objectives. If crankcase hydrocarbons are stored until the engine goes closed-loop, the PCV canister contents can be purged to the engine intake system after closed-loop fuel control is initiated at vertical marker 301. Alternatively, the PCV canister contents can be purged to the engine intake system after the engine temperature meets a predetermined temperature at vertical marker 303. On the other hand, if crankcase hydrocarbons are stored until an engine temperature meets a predetermined temperature at vertical marker 303, then the PCV canister contents can be purged to the intake manifold after the engine temperature meets the predetermined operating temperature. In one example, where PCV canister control valves are configured as illustrated in FIG. 1, valve 71 changes position to allow gases to flow from crankcase 51 to intake manifold 44. Valves 72 and 73 are opened to allow heated intake air to purge hydrocarbon vapors from canister 76 to intake manifold 44. In an alternate embodiment, valve 71 can continue to let crankcase gases pass through canister 76 so that heated crankcase gases will cause hydrocarbons to exit canister 76 and enter intake manifold 44.

PCV canister purge continues from vertical marker 301 or 303 until the engine control strategy detects a reduction of hydrocarbons being admitted from the PCV canister or until vertical marker 305 is reached. Marker 305 indicates that the engine is operating at a low load condition where it can be more difficult to control the engine air-fuel ratio. Temporarily deactivating the PCV purge at vertical marker 305 can improve engine emissions because it can be easier to control engine air-fuel by using fuel injectors rather than using PCV canister hydrocarbon release estimates. PCV canister purge remains deactivated while the engine is at low load conditions. In one embodiment, PCV canister purge can be deactivated by closing valves 71, 72, and 73.

It should be noted that the system configuration illustrated in FIG. 1 allows crankcase gases to bypass the PCV canister when crankcase hydrocarbons are not being stored to the PCV canister. Thus, the system of FIG. 1 can use heated fresh air that is routed through valve 73 and passed through PCV canister 76 and valve 72 to purge the PCV canister while crankcase gases are ingested to the engine via two-way valve 71.

At vertical marker 307, engine load increases and PCV canister purge resumes until the engine control system strategy detects a reduction of hydrocarbons being admitted from the PCV canister or until low engine load conditions are reached.

When fuels comprised of more than a predetermined amount of alcohol are in the crankcase (e.g., 50%), the PCV canister is filled and purged such that hydrocarbons liberated from the crankcase over a narrower temperature range are advantageously combusted by the engine. In one embodiment, PCV canister valves are operated so that crankcase hydrocarbons bypass the PCV canister from engine crank until vertical marker 303 is reached. That is, hydrocarbons are not store to the PCV canister until a predetermined temperature of the engine is reached. In one embodiment, where PCV control valves are configured as illustrated in FIG. 1. The PCV canister is bypassed by setting two-way valve 71 such that crankcase gases to flow from crankcase 51 to intake manifold 44. During PCV bypass, valves 72 and 73 are put in the closed position.

Hydrocarbons are stored in the PCV canister from vertical 303 until vertical marker 305. Hydrocarbons are stored by positioning valve 71 such that gases flow from crankcase 51 to canister 76. Valve 72 is also opened to provide a path for gases to flow from canister 76 to intake manifold 44. Vertical marker 305 in this example indicates two conditions: a low engine load condition and a second predetermined engine temperature. If hydrocarbons are being stored in the PCV canister and if the engine temperature meets or exceeds a predetermined temperature, the PCV canister filling operation can be stopped and the PCV canister contents purged to the engine intake system. On the other hand, if a low engine load is reached while the PCV canister is being filled the PCV canister can continue to fill or filling may be deactivated without purging the PCV canister until a higher engine load is achieved.

At vertical marker 307, engine load increases and PCV canister purge begins purging until the engine control system strategy detects a reduction of hydrocarbons being admitted from the PCV canister or until low engine load conditions are reached. Purge is initiated in the configuration illustrated in FIG. 1 by setting valve 71 to a position where crankcase gases are routed to the intake manifold. In addition, valves 72 and 73 are set to the open position so that heated fresh air is routed through PCV canister 76. In an alternative embodiment, the PCV canister can be purged by setting valve 71 such that crankcase gases can flow from crankcase 41 to PCV canister 76 while valve 72 is open. Valve 73 is not required if PCV purging is performed using crankcase gases.

When fuels comprised of a predetermined mixture range of alcohol and gasoline are in the crankcase (e.g., fuels between 49% and 80% gasoline), the PCV canister is filled and purged such that hydrocarbons liberated from the crankcase are advantageously combusted by the engine. In one embodiment, PCV canister valves are operated so that crankcase hydrocarbons are stored in the PCV canister from engine crank until vertical marker 301 is reached.

Hydrocarbons stored in the PCV canister are then purged to the engine intake system from vertical 301 until vertical marker 303. At vertical marker 303, hydrocarbons are stored again. In this embodiment, vertical marker 303 corresponds to a predetermined temperature of the engine. And the predetermined temperature of the engine is related to the boiling point of a single boiling point fuel (e.g., ethanol). Crankcase hydrocarbons are stored to the PCV canister when the engine reaches the predetermined temperature that is related to the boiling point of the single boiling point fuel.

In this embodiment, vertical marker 305 also indicates two conditions: a low engine load condition and a second predetermined engine temperature. If hydrocarbons are being stored in the PCV canister and the engine meets or exceeds a predetermined temperature the PCV canister filling operation can be stopped and the PCV canister contents purged to the engine intake system. On the other hand, if a low engine load is reached while the PCV canister is being filled the PCV canister can continue to fill or filling may be deactivated without purging the PCV canister until a higher engine load is achieved.

At vertical marker 307, engine load increases and the PCV canister purge cycle begins. Purging continues until the engine control system strategy detects a reduction of hydrocarbons being admitted from the PCV canister or until low engine load conditions are reached.

The methods, routines, and configurations disclosed herein are exemplary and should not be considered limiting because numerous variations are possible. For example, the above disclosure may be applied to I3, I4, I5, V6, V8, V10, and V12 engines operating in natural gas, gasoline, diesel, or alternative fuel configurations.

The following claims point out certain combinations regarded as novel and nonobvious. Certain claims may refer to "an" element or "a first" element or equivalent. However, such claims should be understood to include incorporation of one or more elements, neither requiring nor excluding two or more such elements. Other variations or combinations of claims may be claimed through amendment of the present claims or through presentation of new claims in a related application. The subject matter of these claims should be regarded as being included within the subject matter of the present disclosure.

The invention claimed is:

1. A method for processing gases from a crankcase of an engine, comprising:
   purging gases from the crankcase to an intake while bypassing a canister for a first duration; then
   storing gases from the crankcase in the canister for a second duration; then
   purging the stored gases from the canister for a third duration; and
   delivering exhaust-heated fresh air to the canister during the third duration.

2. The method of claim 1 further comprising moving the gases from the crankcase during predetermined engine operating conditions.

3. The method of claim 2 wherein the predetermined engine operating conditions comprise a temperature of the engine.

4. The method of claim 3 wherein the temperature of the engine is a coolant or oil temperature.

5. The method of claim 1 further comprising moving the gases from the crankcase to the intake while purging the stored gases from the canister.

6. The method of claim 1 wherein an amount of fuel delivered to the engine by fuel injection is decreased when purging the stored gases from the canister.

7. The method of claim 1 wherein a controller adjusts an average position of a valve during a time interval to regulate flow of gases from the canister to the engine.

8. The method of claim 1 further comprising adjusting a position of a valve to control a purge rate of gases from the canister; and combusting the purged gases in the engine.

9. A method for processing gases from a crankcase of an engine comprising:
   purging gases from the crankcase to an intake while bypassing a canister for a first duration; then
   storing gases from the crankcase in the canister for a second duration; then purging the stored gases from the canister for a third duration, wherein one or more of the first, second, and third durations are based on a fuel alcohol content.

10. The method of claim 1 wherein purge gases from the canister are introduced to the engine downstream of an intake throttle.

11. A method for processing gases from a crankcase of an engine, comprising:
    purging gases from the crankcase to an intake while bypassing a canister for a first duration; then
    storing gases from the crankcase in the canister for a second duration; then purging the stored gases from the canister for a third duration, wherein purge gases from the canister are introduced to the engine downstream of an intake throttle, and wherein fresh air from upstream of the intake throttle is routed through the canister to purge the canister.

* * * * *